Patented Dec. 9, 1952

2,621,191

UNITED STATES PATENT OFFICE 2,621,191

PROCESS OF TREATING OIL

Benjamin H. Thurman, New York, N. Y., assignor to Kraft Foods Company, Chicago, Ill., a corporation of Delaware No Drawing. Application October 28, 1948,
Serial No. 57,115

12 Claims. (Cl. 260—409)

This invention relates to a process of treating oil, and more particularly, to a process of producing an edible non-reverting hydrogenated glyceride oil.

In the known processes of producing hydrogenated glyceride oils, liquid, alkali or otherwise refined oils are conventionally subjected to hydrogenation under conditions producing a semi-solid fat of margarine or shortening consistency. The hydrogenation is usually performed by passing hydrogen upwardly through a body of the glyceride oil in which a finely divided nickel catalyst is suspended, the process being carried on at moderately elevated temperatures and under superatmospheric pressure during agitation of the oil. The details of such operations are well known in the art and need not be further described. For producing margarine and shortening, complete hydrogenation to saturate the unsaturated combined fatty acids in the glycerides is not desired. Instead, the desideratum is to hydrogenate the more highly unsaturated combined fatty acids such as linolenic and linoleic acids to oleic acid with the production of only a sufficient amount of stearic acids and iso-oleic acids to provide the desired semi-solid consistency.

Hydrogenated oils, subsequent to hydrogenation, have been conventionally subjected to a batch deodorizing process involving passing steam upwardly through a large body of such oil, for example, 30,000 to 60,000 lbs., positioned in a large, vertically extending tank while the oil is held at a high temperature and subjected to vacuum conditions. Such deodorizing operations are in fact processes of steam distillation at temperatures usually ranging from 400 to 450° F. with a vacuum maintained above the oil corresponding to a pressure of not more than about 2 inches of mercury and usually about 1 inch of mercury. A deep body of the oil is maintained in the tank so that the steam passing upwardly therethrough is substantially uniformly distributed through the upper portions of the body of oil without causing excessive splashing of the oil. The amount of steam will ordinarily range from 0.2 lb. per pound of oil upwardly. Such operations, however, require from 6 to 10 hours under the stated temperature conditions, since it is only the upper few inches of the oil from which the volatile materials causing the deleterious flavor and odor are removed, because of the greater hydrostatic pressure in the lower portions of the body of oil. The amount of deodorization is limited by the time during which it is possible to subject the oil to the high temperatures without developing an objectionable flavor.

Oils from a hydrogenation process always have what is known as a "hydrogenated oil flavor." This flavor is analogous to the odor of a snuffed tallow candle and the major objective of the deodorization process is to remove this flavor as well as other flavors originally present in the oil and not destroyed by the hydrogenation process. The oil removed from the deodorizing process following hydrogenation will ordinarily be a bland oil substantially free from taste and odor, irrespective of the type of glyceride oil treated. However, upon standing, either in storage or after being incorporated into food products, or upon being heated to the temperatures usually employed in deep frying foods, some hydrogenated and deodorized oils again develop what appears to be a hydrogenated oil flavor. Also, some hydrogenated and deodorized oils, particularly soybean oil, revert or develop a very unpleasant flavor characteristic of that particular oil.

In accordance with the present invention, it has been discovered that subjecting the oil to a steam-distillation, high-temperature, heat treatment prior to hydrogenation will so condition the oil as to nullify the effects of the materials in the oil which cause the undesirable odors or flavors to develop in deodorized hydrogenated oil after the hydrogenation operation. It is still necessary, after the conditioning treatment, and subsequent hydrogenation, to deodorize the oil to remove the flavor developed during hydrogenation, but this deodorization treatment may be a relatively mild treatment by use of the batch process, or an effective continuous process can be used.

The steam-distillation conditioning at high temperatures of purified glyceride oils (which have been preliminarily purified as by alkali refining or the like) has not been employed prior to the present invention as a pre-hydrogenation procedure in the glyceride oil industries. In fact, the teaching of the art has been in the opposite direction, for several reasons. The art knew that deodorization must be employed after hydrogenation to produce an edible oil since the hydrogenated oil flavor must be removed, and deodorization after hydrogenation, as practiced in the prior art, had to be a relatively drastic procedure involving the treatment of the oil for long periods of time at high temperatures, the temperature and time conditions being usually the maximum which could be employed without damage to the glycerides of the oil. Hence, any heat treatment prior to hydrogenation involving temperatures of the order reached during conditioning procedures in accordance with the present invention would appear to be, in effect, an extension of the time and temperature conditions of the required subsequent deodorization, which already was approaching the permissive limits if damage to the oil was to be avoided. Moreover, the art knew of no facts which would indicate that a high-temperature, steam-distillation conditioning treatment prior to hydrogenation might have a desirable result.

The preferred oil conditioning operation prior to hydrogenation may be substantially the same as the initial portion of the oil deodorization process disclosed in my co-pending application, Serial No. 57,114 filed of even date herewith. In this process the refined glyceride oil, which is normally an alkali refined glyceride oil, is subjected to high temperatures under high vacuum conditions while steam is passed through a shallow body of the oil and effective contact of the steam with the oil is produced without splashing or substantial entrainment of the oil in the steam. During the initial portion of this process, as disclosed in said application, the refined oil is subjected to a steam-distillation treatment in a plurality of stages at progressively increasing temperatures, starting at a temperature in the neighborhood of 395 to 450° F. and ending with temperatures between 500 and 600° F., and preferably between 550 and 575° F. Subsequent to the high temperature treatment, the oil is cooled in stages while steam is passed therethrough and while a high vacuum is maintained above the oil. For the purposes of this invention, the stage cooling step is not required when treating certain types of oil. In each stage of the deodorization process disclosed in my said application, Serial No. 57,114, a baffle structure, preferably in the form of a screen, is placed immediately above the shallow bath of oil. This prevents violent splashing of the oil and excessive entrainment of the oil in the steam. In addition, it ensures excellent contact between the steam and the oil, as a result of the froth or foam of oil which is carried by the steam upwardly through the screen. This feature is also desirably made a part of the oil-conditioning treatment of the present invention.

During the oil conditioning process of the present invention, a relatively small amount of steam is passed through the oil during the steam-distillation, heat treatment, for example 0.03 to 0.1 lb. of steam per pound of oil. The use of this relatively small amount of steam is effective because of the very effective contact between the steam and the oil at the high vacuum and high temperatures employed. The vacuum employed is within the range of from about ¾ to 3 mm., and preferably is about 1.5 mm., of mercury absolute during the process.

Care is exercised not to heat any portion of the oil substantially above the average temperature in any part of the process, and during the entire conditioning operation, the oil is subjected to temperatures above approximately 400° F. for a period of not more than 2 hours, i. e., from 1 to 2 hours, and the time at the higher temperatures usually is preferably within the range of from 15 minutes to 30 minutes.

The above described pre-hydrogenation conditioning process, which is quite similar to the initial portion of the deodorization process disclosed in my co-pending application, supra, is extremely effective in either removing or otherwise nullifying the effects of those substances which cause reversion after hydrogenation and subsequent deodorization. Such process, is, however, merely exemplary of effective oil conditioning processes, and any other steam-distillation, heat treatment processes which will substantially nullify the effects of the reversion causing materials, by actual removal, or otherwise, may be employed. For example, in contrast, to the step-heating process described above, the oil may be immediately and rapidly carried to the highest temperature employed in the process and then subjected to steam distillation under the high vacuum conditions described in a series of stages at progressively decreasing temperatures, an absolute pressure of 3 mm. or less being employed at the highest temperatures. The exact nature of the substances which produce reversion in hydrogenated oil is not wholly understood, and whether those substances are actually removed from the oil or whether they are merely altered by the conditioning treatment has not been established. However, it has been determined that a pre-conditioning treatment involving steam-distillation and heat, as above described, which will reduce the tocopherol content of the oil to a value less than about .03% will nullify, or render ineffective, the reversion-producing capabilities of these substances.

Following the steam-distillation and heat treatment conditioning treatment and prior to hydrogenation, the oil can be cooled, while being subjected to steam and vacuum, in accordance with the cooling procedure set forth in my application, Serial No. 57,114. However, cooling under vacuum and in the presence of steam is not essential in the practice of the present invention. The oil can be cooled immediately to any desired temperature without being subjected to steam or to vacuum during the cooling operation, or it may not be cooled below hydrogenation temperatures, if that is convenient. The steam distillation and heat treatment conditioning process effectively nullifies the reversionary capabilities of the materials which normally produce reversion in hydrogenated oil, and subsequent cooling, or lack of cooling, will not alter that change in the oil. So long as the oil is hot, it is desirable that the oil be kept out of contact with air until it has reached a temperature below about 160° F. If the cooling step is eliminated, the oil may be conducted from the conditioning apparatus, while still hot, directly into the hydrogenation apparatus, where it may be cooled, if necessary, to the desired hydrogenation temperature (usually about 400° or less). It may also be cooled to hydrogenation temperature by being passed through a heat exchanger or other cooling means enroute to the hydrogenator. An apparatus wherein conditioned oil can be delivered directly to a hydrogenator is shown in my prior application, Serial No. 553,744, filed September 22, 1944.

For glyceride oils which are most prone to reversion, for example, oils such as soybean oil, temperatures in the higher portion of the range, i. e., temperatures at least as high as 560° F. under a vacuum corresponding to an absolute pressure between ¾ and 3 mm. of mercury and preferably about 1.5 mm. of mercury will ordinarily be employed in the oil-conditioning process. For oils which are less prone to reversion, such as cottonseed and corn oils, temperatures in the lower portion of the higher range, for example, temperatures of 500 to 550° F. may be satisfactorily employed under the vacuum and time conditions mentioned. It may also be possible to condition some glyceride oils prior to hydrogenation by a steam distillation batch process, as distinguished from the continuous process above described. This requires careful handling of the oil, limiting of the time of treatment, the temperature reached and, to minimize loss of oil, avoidance of excessive entrainment of the oil in the steam. For example, with certain oils, the rapid heating of a batch of oil to a temperature in excess of about 500° F., and the holding of the oil at that temperature for a period of about 30 minutes, will nullify the effect of the reversion producing materials. As disclosed in my copending application Serial No. 57,114, the temperatures discussed above are sufficiently high to damage the oil by impairing its edible qualities but such damage is prevented by restricting the time of treatment at such temperatures to such brief periods as disclosed above so as to avoid impairment of the edible properties of the oil.

The hydrogenation which follows the initial conditioning treatment may be any suitable batch or continuous operation including the conventional processes of the prior art. Such hydrogenation processes need not be further described.

The final or deodorization step may be a continuous or a batch treatment. Thus, conventional steam-deodorizing batch operations at temperatures of 400 to 450° F., may be employed with the conventional vacuums of the prior art, i. e., a vacuum of at least 28 inches of mercury. The time of deodorization in such batch operations will usually be somewhat less than that employed in prior art batch operations, for example, the time may range from 4 to 6 hours. It is preferred, however, to employ a rapid continuous deodorization process, involving step or stage heating, such as is described above with reference to my co-pending application, Serial No. 57,114, with the exception that the highest temperature reached may be considerably less than the highest temperature reached in that treatment. For example, to accomplish deodorization of the conditioned and hydrogenated oil, the highest temperature stage of such a continuous deodorization operation may have a temperature ranging from between approximately 450 to 525° F. and the total time of treatment may be 1 to 1½ hours, the time of treatment at the higher temperature preferably being between 15 and 30 minutes. As previously described, a high vacuum producing an absolute pressure of less than 3 mm. of mercury and preferably less than 1.5 mm. of mercury is employed while steam is passed through a shallow body of the oil. That is to say, the oil may be removed from a continuous deodorizing process similar to that described in my aforesaid co-pending application before the final deodorization stages, for example, after the third stage of a four-stage process or after the fifth stage of a seven-stage process. It is, of course, important during continuous deodorization processes of this type, to cool the deodorized oil in the presence of steam and under a high vacuum to a temperature below approximately 300 to 350° F.

As a specific example of producing a bland non-reverting hydrogenated glyceride oil, a conventionally alkali-refined and bleached soya-bean oil was subjected to the process of the present invention. Soya-bean oil was selected since this type of oil presents a more difficult deodorizing problem than any of the other common edible oils.

The refined and bleached soya-bean oil was first subjected to a steam-distillation conditioning treatment at high temperatures and under high vacuum in apparatus similar to that disclosed in my co-pending application referred to above. This treatment involved introducing steam into the lower portions of shallow baths of oil in each of seven vaporizing chambers or stills in which screens in the form of perforated metal sheets were positioned just above the oil to minimize surging and splashing of the oil while ensuring intimate contact of the steam with the oil. The stills were elongated cylindrical chambers having a horizontal axis in which the oil depth was maintained at approximately 14 inches, this depth being about ⅓ the internal height of the chambers. The steam carried oil upwardly through perforations in the central portions of the screens to produce a continuously breaking foam on the upper surfaces of the screens, oil from the breaking foam returning to the bodies of oil below the screens through perforations along the edge portions of the screens.

The oil was continuously passed through the stills in series, being continuously introduced into one end of each still and withdrawn from the other end. The oil was heated by indirect heat exchange in stream flow before being introduced into the first still and also before being introduced into each of the second, third and fourth stills. The oil leaving the fourth, fifth and sixth stills was cooled in steam flow by indirect heat exchange before being introduced into the next succeeding still, and again cooled in the same manner after leaving the last still. The entire system was closed and maintained under vacuum by withdrawing and condensing vapors from each of the stills.

The amount of oil contained in the shallow body of oil in each still was approximately 2900 lbs., and the rate of oil flow was approximately 7,000 lbs. per hour so that the time that the oil remained in each still was approximately 25 minutes. Also, each heating or cooling operation required approximately 5 minutes. The temperatures of the oil entering and leaving each still was approximately as follows:

| Still No. | Oil In | Oil Out |
| --- | --- | --- |
|  | ° F. | ° F. |
| 1 | 435 | 425 |
| 2 | 460 | 450 |
| 3 | 500 | 490 |
| 4 | 550 | 545 |
| 5 | 420 | 410 |
| 6 | 400 | 390 |
| 7 | 325 | 315 |

The oil was cooled in the last cooling stage following the last still to approximately 95° F. The absolute pressure maintained above the oil in each of stills 1 to 4, inclusive, was 1.9 mm. of mercury and the absolute pressure maintained above the oil in each of stills 5 to 7, inclusive, was 3.0 mm. of mercury. The amount of steam distributed into the oil in each of stills 1 to 4, inclusive, was 112 lbs. per hour, and the amount distributed into the oil in each of stills 5 to 7, inclusive, was 50 lbs. per hour, making a total of 598 lbs. per hour or approximately 0.085 lbs. of steam per pound of oil in the entire process.

A batch of the resulting oil was then hydrogenated in a conventional batch hydrogenation operation using finely divided nickel as a catalyst until the oil was of margarine consistency after cooling. The details of such operations are well known to the art. The hydrogenated oil, while still at a temperature at which the oil was liquid, was filtered to remove suspended nickel and subjected to a mild bleaching operation using a bleaching earth. The resulting oil was then subjected to a conventional batch deodorizing treatment at a temperature of 425° F. and an absolute pressure of approximately 10 mm. of mercury for about 4 hours. The final oil was substantially free of any tendency to revert to either a hydrogenated oil flavor or a reverted soya-bean oil flavor.

In the practice of the process of the present invention the hydrogenated oil removed from the final or deodorizing operation is a bland oil which, upon cooling, assumes a semi-solid state suitable for margarine or shortening. It retains its bland property even after storage over extended periods of time, either in bulk or in edible food products. It is furthermore substantially free from reversion even after heating to cooking temperatures. It will therefore be apparent that I have provided a novel sequence of steps involving an oil conditioning step before hydrogenation, a hydrogenation step, and a final deodorizing step which produces an improved edible oil. The process is particularly suited for the treatment of soya-bean oil.

The present application is a continuation-in-part of my copending applications, Serial No. 553,744, filed September 22, 1944, and Serial No. 744,846, filed April 30, 1947.

I claim:

1. The process of producing an improved, non-reverting, edible, hydrogenated oil, which comprises, conditioning a refined glyceride oil by a steam distillation treatment while the oil is at a temperature within the range of 500° to 600° F. and under high vacuum conditions sufficient to nullify the reversionary capabilities of substantially all of the materials in said oil which cause reversion of such oils after hydrogenation and subsequent deodorization, hydrogenating the thus-conditioned oil to semi-solid form, and thereafter deodorizing said oil by steam distillation under vacuum and temperature conditions producing a bland oil.

2. The process of producing an improved, non-reverting, edible, hydrogenated oil, which comprises the steps of conditioning a refined glyceride oil by a steam distillation treatment in which the oil is subjected to temperatures within the range of from about 500 to 600° F., at an absolute pressure between about 3/4 and 3 mm. of mercury, for a period within the range of from about 15 to 30 minutes, said conditioning treatment nullifying the reversionary capabilities of substantially all of the materials in said oil which cause reversion of such oils after hydrogenation and subsequent deodorization, hydrogenating the thus-conditioned oil to semi-solid form, and thereafter deodorizing said oil by steam distillation under vacuum and temperature conditions producing a bland oil.

3. The process of producing an improved, non-reverting, edible, hydrogenated oil, which comprises the steps of conditioning a refined glyceride oil by a steam distillation treatment in which the oil is treated in a plurality of stages at temperatures above about 400° F. for a time ranging between about 1 and 2 hours and at an absolute pressure between about 3/4 and 3 mm. of mercury, the temperatures in the highest temperature stage being within the range of from about 500 to 600° F. and the time in said highest temperature stage being within the range of from about 15 to 30 minutes, said conditioning treatment nullifying the reversionary capabilities of substantially all of the materials in said oil which cause reversion of such oils after hydrogenation and subsequent deodorization, hydrogenating the thus-conditioned oil to semi-solid form, and thereafter deodorizing said oil by steam distillation under vacuum and temperature conditions producing a bland oil.

4. The process of producing an improved, non-reverting, edible, hydrogenated oil, which comprises the steps of conditioning a refined glyceride oil by a steam distillation treatment while the oil is at a temperature within the range of 500° to 600° F. and under high vacuum conditions sufficient to nullify the reversionary capabilities of substantially all of the materials in said oil which cause reversion of such oils after hydrogenation and subsequent deodorization, hydrogenating the thus-conditioned oil to semi-solid form, and thereafter deodorizing said oil by a steam distillation process which utilizes a maximum temperature within the range of from about 400 and 525° F. and a vacuum of at least 28 inches of mercury to produce a bland oil.

5. The process of producing an improved, non-reverting, edible, hydrogenated oil, which comprises the steps of conditioning a refined glyceride oil by a steam distillation treatment in which the oil is subjected to temperatures within the range of from about 500 to 600° F. at an absolute pressure between about 3/4 and 3 mm. of mercury, for a period within the range of from about 15 to 30 minutes, said conditioning treatment nullifying the reversionary capabilities of substantially all of the materials in said oil which cause reversion of such oils after hydrogenation and subsequent deodorization, hydrogenating the thus-conditioned oil to semi-solid form, and thereafter deodorizing said oil by a steam distillation process which utilizes a maximum temperature within the range of from about 400 to 525° F. and a vacuum of at least 28 inches of mercury to produce a bland oil.

6. The process of producing an improved, non-reverting, edible, hydrogenated oil, which comprises the steps of conditioning a refined glyceride oil by a steam distillation treatment in which the oil is treated in a plurality of stages at temperatures above about 400° F. for a time ranging between about 1 and 2 hours and at an absolute pressure between about 3/4 and 3 mm. of mercury, the temperatures in the highest stage being within the range of from about 500 to 600° F. and the time in said highest temperature stage being within the range of from about 15 to 30 minutes, said conditioning treatment nullifying the reversionary capabilities of substantially all of the materials in said oil which cause reversion of such oils after hydrogenation and subsequent deodorization, hydrogenating the thus-conditioned oil to semi-solid form, and thereafter deodorizing said oil by a steam distillation process which utilizes a maximum temperature within the range of from about 400 to 525° F. and a vacuum of at least 28 inches of mercury to produce a bland oil.

7. The method of producing an improved, non-reverting, edible, hydrogenated oil wherein the materials which normally cause reversion of such oil after hydrogenation and subsequent deodorization have been rendered ineffective to cause such reversion, which comprises the steps of first conditioning said oil prior to hydrogenation by a steam distillation process which is carried out under such conditions of temperature and vacuum and for such periods of time that the tocopherol content of the oil is reduced to a value of less than about .03%, subsequently hydrogenating the conditioned oil to a semi-solid form, and thereafter deodorizing said oil.

8. The method of producing an improved, non-reverting, edible, hydrogenated, soya bean oil wherein the materials which normally cause reversion of soya bean oil after hydrogenation and subsequent deodorization have been rendered ineffective to cause such reversion, which comprises the steps of first conditioning said oil prior to hydrogenation by a steam distillation process which is carried out under such conditions of temperatures and vacuum and for such periods of time that the tocopherol content of the oil is reduced to a value of less than about .03%, subsequently hydrogenating the conditioned soya bean oil to a semi-solid form, and thereafter deodorizing said oil.

9. The method of producing an improved, non-reverting, edible, hydrogenated soya bean oil wherein the materials which normally cause reversion of soya bean oil after hydrogenation and subsequent deodorization have been rendered ineffective to cause such reversion, which comprises the steps of first conditioning said oil by a steam distillation treatment in which the oil is subjected to temperatures within the range of from about 575 to 600° F. in an absolute pressure between about ¾ and 3 mm. of mercury for a period of time within the range of from about 15 to 30 minutes, subsequently hydrogenating the conditioned oil to a semi-solid form, and thereafter deodorizing said oil by a steam distillation treatment.

10. A continuous process for producing an edible, non-reverting soyabean oil and recovering valuable by-products including tocopherol, which comprises, the steps of first subjecting said oil to an initial deodorizing treatment to vaporize the more volatile impurities therefrom and to condition said oil for a subsequent higher temperature deodorizing step without injury to the edible properties of the oil, subjecting the thus initially conditioned oil while in continuous flow to a temperature between approximately 500 and 600° F., restricting the time of said subsequent deodorizing step to a relatively few minutes to prevent injury to said oil, recovering and condensing the vaporized volatile materials including tocopherol as valuable by-products, said oil in said subsequent deodorizing step being subjected to steam treatment by passing steam upwardly through a shallow body of said oil, said steam and said vapors being removed from above said oil at a sufficient rate to maintain an absolute pressure not greater than approximately 3 mm. of mercury, subjecting the oil from said subsequent deodorizing step to hydrogenation and thereafter subjecting the resulting hydrogenated oil to a further deodorizing step to produce a non-reverting, hydrogenated edible soyabean oil.

11. The process of producing an improved, substantially non-reverting, hydrogenated oil, which comprises, subjecting a glyceride oil to a steam distillation conditioning treatment including passing steam upwardly through said oil while said oil is at a sufficiently high temperature and under sufficient vacuum to nullify the reversionary capabilities of substantially all of the materials in said oil which cause reversion of such oil after hydrogenation and subsequent deodorization, said temperature being sufficiently high to damage said oil by impairing the edible properties thereof, preventing damage to said oil by restricting the time of treatment thereof at said temperature to such a brief period as to avoid impairment of the edible properties of said oil, hydrogenating the thus conditioned oil, and thereafter deodorizing said oil by steam distillation under vacuum and temperature conditions producing a bland oil.

12. The method of producing an improved, substantially non-reverting, edible, hydrogenated, soya bean oil wherein the materials which normally cause reversion of soya bean oil after hydrogenation and subsequent deodorization have been rendered ineffective to cause such reversion, which comprises the steps of first conditioning said oil prior to hydrogenation by a high temperature, high vacuum steam distillation treatment including passing steam upwardly through said oil while said oil is at a sufficiently high temperature and under sufficient vacuum to nullify the reversionary capabilities of substantially all of the materials in said oil which cause reversion of such oil after hydrogenation and subsequent deodorization, said temperature being sufficiently high to damage said oil by impairing the edible properties thereof, preventing damage to said oil by restricting the time of treatment thereof at said temperature to such a brief period as to avoid impairment of the edible properties of said oil, hydrogenating the thus conditioned oil to semisolid form, and thereafter deodorizing said oil.

BENJAMIN H. THURMAN.

REFERENCES CITED

The following references are of record in the file of this patent:

UNITED STATES PATENTS

| Number | Name | Date |
| --- | --- | --- |
| 2,351,832 | Neal | June 20, 1944 |

OTHER REFERENCES

Bailey, Industrial Oil and Fat Products, p. 610, Interscience Publishers Inc., New York, 1945.